US00RE49540E

(19) United States
(12) Reissued Patent
Mercer et al.

(10) Patent Number: US RE49,540 E
(45) **Date of Reissued Patent: *Jun. 6, 2023**

(54) ELECTRIC VEHICLE CHARGING DEVICE

(71) Applicant: Volta Charging, LLC, San Francisco, CA (US)

(72) Inventors: Scott A. Mercer, Pacifica, CA (US); Michael A. Menendez, Vashon, WA (US); Christopher R. Ching, Los Angeles, CA (US); Raul G. Podesta, La Plata (AR)

(73) Assignee: Volta Charging, LLC, San Francisco, CA (US)

( * ) Notice: This patent is subject to a terminal disclaimer.

(21) Appl. No.: 29/811,247

(22) Filed: Oct. 13, 2021

Related U.S. Patent Documents

Reissue of:
(64) Patent No.: Des. 844,559
Issued: Apr. 2, 2019
Appl. No.: 29/441,028
Filed: Dec. 31, 2012

U.S. Applications:
(60) Continuation of application No. 29/771,060, filed on Feb. 19, 2021, now Pat. No. Re. 48,837, which is a division of application No. 29/707,818, filed on Oct. 1, 2019, now Pat. No. Re. 48,500, which is an application for the reissue of Pat. No. Des. 844,559.

(51) LOC (14) Cl. ..... 13-02
(52) U.S. Cl.
USPC ..... D13/107
(58) Field of Classification Search
USPC ..... D13/107–110, 118–119, 184; D14/251, D14/253, 432, 434
CPC ..... Y02E 60/12; Y02T 90/14; Y02T 90/122; Y02T 90/128; Y02T 90/163; H02J 7/025; H02J 7/0042; H02J 7/0044; H02J 7/0045; H02J 7/0003; H02J 7/0027; H02J 7/0013; H02J 7/0054; H02J 7/00; H02J 2001/008; H02J 3/32; H02J 3/008; H01F 38/14; H01R 13/6675; H01M 2/1022; H01M 2/1055; H01M 10/44; H01M 10/46; H01M 10/425; B60L 11/182; B60L 11/1809; B60L 11/1861; B60R 16/03
See application file for complete search history.

(56) References Cited

U.S. PATENT DOCUMENTS

| | | | | | |
|---|---|---|---|---|---|
| D273,580 | S | * | 4/1984 | Riumbau | D13/107 |
| D459,234 | S | | 10/2002 | Kajiura | |
| 6,459,234 | B2 | | 10/2002 | Kajiura | |
| D507,813 | S | * | 7/2005 | Gillard | D20/19 |
| D542,849 | S | * | 5/2007 | Hill et al. | D20/10 |
| D608,733 | S | | 1/2010 | Smith | |
| D608,734 | S | | 1/2010 | Smith | |
| D613,683 | S | | 4/2010 | Baxter et al. | |
| D618,168 | S | | 6/2010 | Baxter et al. | |
| D618,204 | S | | 6/2010 | Andre et al. | |
| D626,063 | S | | 10/2010 | Cutter et al. | |
| D626,064 | S | | 10/2010 | Cutter et al. | |
| D626,065 | S | | 10/2010 | Cutter et al. | |
| D633,908 | S | | 3/2011 | Akana et al. | |
| D637,553 | S | | 5/2011 | Shin | |
| D644,218 | S | | 8/2011 | Akana et al. | |
| D646,269 | S | * | 10/2011 | Crick et al. | D14/307 |
| D647,053 | S | | 10/2011 | Gotou et al. | |
| D654,430 | S | | 2/2012 | Demers et al. | |
| D654,857 | S | | 2/2012 | Salazar et al. | |
| D654,858 | S | | 2/2012 | Salazar et al. | |
| D654,860 | S | | 2/2012 | Holthusen | |
| D654,861 | S | | 2/2012 | Holthusen | |
| D659,635 | S | | 5/2012 | Hou et al. | |
| D664,086 | S | | 7/2012 | Chin-Ho Kim et al. | |
| D664,087 | S | | 7/2012 | Chin-Ho Kim et al. | |
| D664,089 | S | | 7/2012 | Chin-Ho Kim et al. | |
| D669,071 | S | | 10/2012 | Akana et al. | |
| D674,334 | S | * | 1/2013 | Cutter et al. | D13/107 |
| D691,208 | S | * | 10/2013 | Gorelick | D20/10 |
| D696,658 | S | * | 12/2013 | Winston et al. | D14/307 |
| D708,573 | S | * | 7/2014 | Gieniec et al. | D13/107 |
| D712,349 | S | * | 9/2014 | Ahlgren | D13/107 |
| D720,285 | S | * | 12/2014 | Gilomen | D13/107 |
| D729,157 | S | * | 5/2015 | Gilomen | D13/107 |
| D730,822 | S | * | 6/2015 | Chin-Ho Kim | D13/107 |
| D733,647 | S | * | 7/2015 | Farrell | D13/107 |
| D749,503 | S | * | 2/2016 | Ferguson | D13/107 |
| 9,325,182 | B2 | * | 4/2016 | Venkataraman | B60L 53/30 |
| D771,562 | S | * | 11/2016 | Dolle | D13/107 |
| D777,101 | S | * | 1/2017 | Shimada | D13/107 |

(NEW)

| | | | | | |
|---|---|---|---|---|---|
| D778,818 | S | * | 2/2017 | Bruining | D13/107 |
| 9,705,346 | B2 | * | 7/2017 | Bonwit | B60L 53/305 |
| D816,077 | S | * | 4/2018 | Benic | D14/307 |
| D833,387 | S | * | 11/2018 | Baxter | D13/107 |
| D838,668 | S | * | 1/2019 | Westfall | D13/107 |
| D842,242 | S | * | 3/2019 | Zhang | D13/107 |
| D844,559 | S | | 4/2019 | Mercer et al. | |
| D858,435 | S | * | 9/2019 | Helnerus | D13/107 |
| D868,687 | S | * | 12/2019 | da Silva | D13/107 |
| D872,687 | S | * | 1/2020 | Mortun | D13/107 |
| D876,342 | S | * | 2/2020 | Mercer | D13/107 |
| D876,345 | S | * | 2/2020 | Mercer | D13/107 |
| D876,346 | S | * | 2/2020 | Mercer | D13/107 |
| D883,199 | S | * | 5/2020 | Santander | D13/107 |
| D884,613 | S | * | 5/2020 | Minkyo | D13/107 |
| 2010/0296234 | A1 | * | 11/2010 | Crick, Jr. | 361/679.21 |
| 2011/0145141 | A1 | * | 6/2011 | Blain | 320/109 |
| 2012/0262112 | A1 | | 10/2012 | Ross | |
| 2013/0069588 | A1 | * | 3/2013 | Oda et al. | 320/109 |
| 2013/0207606 | A1 | * | 8/2013 | Ranga et al. | B60L 53/31 320/109 |

OTHER PUBLICATIONS

"Electric-Vehicle Charging Stations Available at ACC Campuses." [retrieved Dec. 30, 2012]. Retrieved from the Internet: <www.google.com/imgres?q=electnc +vehicle+charging+stafions&start=738&um=1&hl=en&tbo=d&biw=1440&bih=783&tbm=isch&tbnid=BCVZxvxp_xJfmM:&imgrefurl=http:Mnsideacc.ausfincc.edu/index.php/2012/01/13/electric-vehicle-charging-stafions-available-at-acc-campuses/&docid=WIRnei31J_vhM&imgurl=http://insideacc.austincc.edu/wp-content/uploads/HBC-Charging-Station>.

Parsons, Sarah. "France Announces $2.2 Billion Electric Car Charging Network." [retrieved on Dec. 28, 2012]. Retrieved from the Internet: <www.google. com/imgres?q=electric+vehicle-Fcharging+stations&num=10&um=1&h1=en&tbo=d&biw=1440&bih=783&tbm=isch&tbnid=QfP2cslOfm0K2MAimgrefurl=http://inhabitat.com/massachusetts-set-to-install-100-ev-charging-stations/&docid=NKQtedu9SWSKBM&imgurl=http://assets.inhabitat.com/wp-content/uploads/>.

Smartlet Coulomb Charging Station. [retrieved Nov. 7, 2012]. Retrieved from the internet: <www.google.com/imgres?q=electnc+vehicle+charging+stations&num=10&um=1&h1=en&tbo=d&biw=1440&bih=783&tbm=isch&tbnid=RKicGBKiRP2P7M:&imgrefurl=http://news.cnet.com/8301-11128_3-10167445-54.html&docid=CWP1h-N1014k3M&imgurl=http://news.cnet.com/i/bto/20090219/smartlet_Coulomb_charging_station-cityhall_270x407.

Bloomfield, Nikki Gordon. "Need An Electric Car Charging Station At Work? Here's One For Free." [retrieved Nov. 7, 2012]. Retrieved from the Internet: <www.google.com/imgres?q-electric+vehicle-Fcharging+stations&start=22&num=10&um=1&h1=en&tbo=d&biw=1440&bih=783&tbm=isch&tbnid=njkABIvYoMe0IM:&imgrefurl=http://www.greencarreports.com/news/1079118_need-an-electric-car-charging-station-at-work-heres-one-for-free&docid=7ywn-IMbSk0AgM&imgurl=http://images.thecarconnection.com/smUchargepoint_100182292_s. n>.

Buffalo Niagara Medical Campus. "Electric Vehicle Charging Stations Installed Across Campus." [retrieved on Dec. 30, 2012]. Retrieved from the Internet: <www.google.com/imgres?q=electric+vehicle-Fcharging+stations&start=554&um=1&h1=en&tbo=d&biw=1440&bih=783&tbm=isch&tbnid=5QoChyg4wMwOeM:&imgrefurl=http://www.bnmc.org/electric-vehicle-charging-stations-installed-across-campus/&docid=V1NctdKztXxtKM&imgurl=http://www.bnmc.org/wp-content/uploads/charging-stations>.

"Smart Grids, Fast Charging—Infrastructure for Electric Car." [retrieved on Nov. 7, 2012]. Retrieved from the Internet: <www.google.com/imgres? q=electric+vehicle+charging+stations&start=20&num=10&um=l&h1=en&tbo=d&biw=1440&bih=783&tbm=isch&tbnid=f4piNYxrLOy80M:&imgrefurl=http://www.impactlab.net/2008/07/28/smart-grids-fast-charging-infrastructure-for-electric-cars/&docid=3pBfeFHp7Jg9mM&imgurl=http://www.impactlab.com/wp-content/uploads/2008/07/charging-station-london>.

"EV Charging station, Volta—Honolulu, Hawaii." [retrieved on Dec. 30, 2012]. Retrieved from the internet: <www.google.com/imgres?q=electric+vehicle -Fcharging+stations&start=307&num=10&um=l&h1=en&tbo=d&biw=1440&bih=783&tbm=isch&tbnid=78HBWHajq0_ydM:&imgrefurl=http://www.examiner.com/article/ev-news-first-hotel-to-install-electric-car-charging-station-for-guests&docid=Hv6RWgv08bpOOM&imgurl=http://www.examiner.com/images/blog/wysiwyg/image/>.

"EV News: first hotel to install electric car charging station for guests." [retrieved on Nov. 7, 2012]. Retrieved from the Internet: <www.google.com/ imgres?q=electric+vehicle+charging+stations&start=307&num=10&um=l&h1=en&tbo=d&biw=1440&bih=783&tbm=isch&tbnid=78HBWHajq0_ydM:&imgrefurl=http://www.examiner.com/article/ev-news-first-hotel-to-install-electric-car-charging-station-for-guests&docid=Hv6RWgv08bpOOM&imgurl=http://www.examiner.com/images/blog/wysiwyg/image/>.

Stewart, Douglas. "On the Same Day . . . Doe Ramps up Electric Vehicle Information; Costco removes EV chargers "No one uses" them." [retrieved on Nov. 7, 2012]. Retrieved from the Internet: <www.google.com/imgres?q=electric+vehicle+charging+stations&num=10&um=1&hl=en&tbo=d&biw=1440&bih=783&tbm=isch&tbnid=fy1RBJOdzLlwDM:&imgrefurl=http://ameristroika.wordpress.com/2011/08/30/on-the-same-day-doe-ramps-up-electric-vehicle-information-costco-removes-ev-chargers-no-one-uses-them/&docid=z4L5TL-rLf6l2M&imgurl=http://ameristroika.files.wordpress.com/2011/08/ev-recharging-station1>.

"Top 20 electric vehicle charging station companies." [retrieved Nov. 7, 2012]. Retrieved from the Internet: <www.google.com/imgres?q=electnc+vehicle+charging+stations&start=22&num=10&um=1&h1=en&tbo=d&biw=1440&bih=783&tbm=isch&tbnid=Xkyb5eDD_qzaxM:&imgrefurl=http://www.evcarco.com/evcarco/2012/01/27/ev-industry-charing-station-trends-united-states/&docid=kQyau38F05amJM&imgurl=http://www.evcarco.com/evcarco/wp-content/uploads/2012/01/EV-Charg ing-Station-Fast>.

"Singapore: Robert Bosch appointed to set up EV charging station infraseture." [retrieved on Dec. 30, 2012]. Retrieved from the Internet: <www.google.com/imgres?q=electric+vehicle-Fcharging+stations&start=59&num=10&um=l&h1=en&tbo=d&biw=1440&bih=783&tbm=isch&tbnid=zbLiKh-Op7OWnM:&imgrefurl=http://theenergycollective.com/sklowem/44983/singapore-robert-bosch-appointed-set-ev-charging-station-infrastructure&docid=LNEAMWlerfHiDM&imgurl=http://lh5.ggpht.comLBgmD4flGMVc/TK_7eL5IPW1/AAAAAAAAEeb>.

Campus Life Services. "Charge your vehicle with us." [retrieved on Dec. 30, 2012]. Retrieved from the Internet: <www.google.com/imgres?q=electric+vehicle-Fcharging+stations&start=713&um=1&h1=en&tbo=d&biw=1440&bih=783&tbm=isch&tbnid=9kS7R5ujBHDTOM:&imgrefurl=http://campuslifeservices.ucstedukls/16.784&docid=YUOFyHbLzoddxMimgurl=http://campuslifeservices.ucsf.edu/upload/cls/body_images/EV_2_car_charge_unit300jpg&w=300&h=400&ei=GmqZULylLsSxDAG--4CoDA&zoom=l&iact=hc&vpx=595&vpy=11&dur=8286&hovh=259&hu>.

University of Maryland: The Department of Transportation Services. "About Electric Vehicle Charging Stations." [retrieved on Nov. 7, 2012]. Retrieved from the Internet: <http://www.google.com/imgres?q=electric+vehicle+charging+kiosk&um=1&h1=en&tbo=d&biw=813&bih=453&tbm=isch&tbnid=s6QZc2vv4M1g-MAimgrefurl=http://www.transportafion.umd.edu/chargingstafion.html&docid=DuYNDCLIkGewXM&imgurl=http://www.transportation.umd.edu/images/charging-station.png&w=230&h=320&ei=dGuZUK3sL9060AGz9oHIDw&zoom=1&iact=hc&vpx=498&vpy=59&dur=3576&hovh=256Ma>.

Moon, Jade. "Getting An EV Charge for Free." [retrieved on Dec. 30, 2012]. Retrieved from the Internet: <www.google.com/imgres?q-electric-Fvehicle+charging+kiosk&um=1&h1=en&tbo=d&biw=813&bih=453&tbm=isch&tbnid=spbpBxbTvGDwIMAimgrefurl=http://www.midweek.com/getting-an-ev-charge-for-free/&docid=Wh1DDUhKhM7U1M&imgurl=http://www.midweek.com/wp-content/uploads/2012/04/moon.jpg&w=300&h=199&ei=dGuZUK3sL9060AGz9oHIDw&zoom=1&iact=hc&vpx=4&vpy=185&dur=3366&hovh=159&hou>.

Electric Vehicle Kiosk. [retrieved on Nov. 7, 2012]. Retrieved from the Internet: <www.google.com/imgres?q=electric+vehicle+charging+ kiosk&um=l&h1=en&tbo=d&biw=813&bih=453&tbm=isch&tbnid=19Qs24hR5V2XAM:&imgrefurl=http://article.wn.com/view/2012/04/04/0pConnect_Leads_the_Way_With_Social_MediaEnabled_Electric_Ve/&docid=GswMh lig P_2aVM&imgurl=http:M.ytimg.com/vi/SdF4WoQqkYY/0.jpg&w=480&h=360&ei=dGuZUK3sL9060AGz9oHIDw&zoom=1&iact=hc&vpx=530&vpy=17&dur=10132&hovh=19441>.

* cited by examiner

*Primary Examiner* — Darlington Ly
(74) *Attorney, Agent, or Firm* — Morgan, Lewis & Bockius LLP

(57) CLAIM

The ornamental design for an electric vehicle charging [system] *device*, as shown and described.

DESCRIPTION

[FIG. 1 is an upper left front perspective view of an electric vehicle charging system showing our new design;]
[FIG. 2 is an upper right rear perspective view thereof;]
[FIG. 3 is a front elevational view thereof;]
[FIG. 4 is a right side elevational view thereof;]
[FIG. 5 is a rear elevational view thereof;]
[FIG. 6 is a left side elevational view thereof;]
[FIG. 7 is a top plan view thereof;]
[FIG. 8 is a bottom plan view thereof;]
[FIG. 9 is a top left from perspective cutaway view showing illumination elements;]
[FIG. 10 is a side and enlarged elevational cutaway view of the electric vehicle charging system of FIGS. 4 and 6; and,]
[FIG. 11 is an enlarged bottom plan view showing details of air vents of the electric vehicle charging system of FIG. 8.]
*FIG. 12 is an upper left front perspective view of a second embodiment of an electric vehicle charging device showing our new design;*
*FIG. 13 is an upper right rear perspective view thereof;*
*FIG. 14 is a front elevational view thereof;*
*FIG. 15 is a right side elevational view thereof;*
*FIG. 16 is a rear elevational view thereof;*
*FIG. 17 is a left side elevational view thereof;*
*FIG. 18 is a top plan view thereof;*
*FIG. 19 is a bottom plan view thereof;*
*FIG. 20 is a top left from perspective cutaway view;*
*FIG. 21 is a side and enlarged elevational cutaway view of the electric vehicle charging device of FIG. 17; and,*
*FIG. 22 is an enlarged bottom plan view showing details of the electric vehicle charging device of FIG. 19.*
[The shade lines in the Figures show contour and not surface ornamentation.]
The broken lines in the Figures show portions of the electric vehicle charging [system] *device* which [forms] *form* no part of the claimed design.

1 Claim, 10 Drawing Sheets

Figure 1:
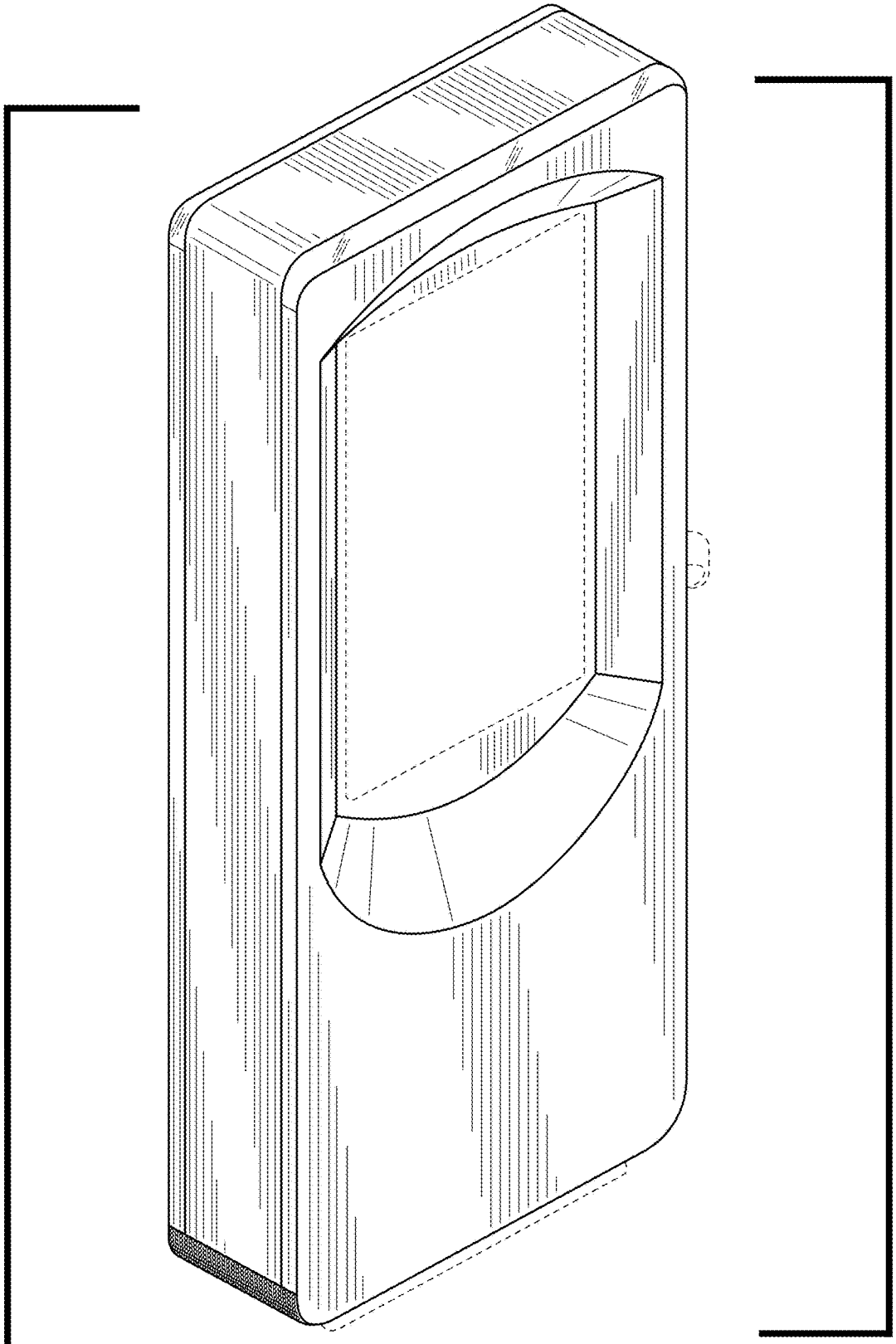
Figure 2:
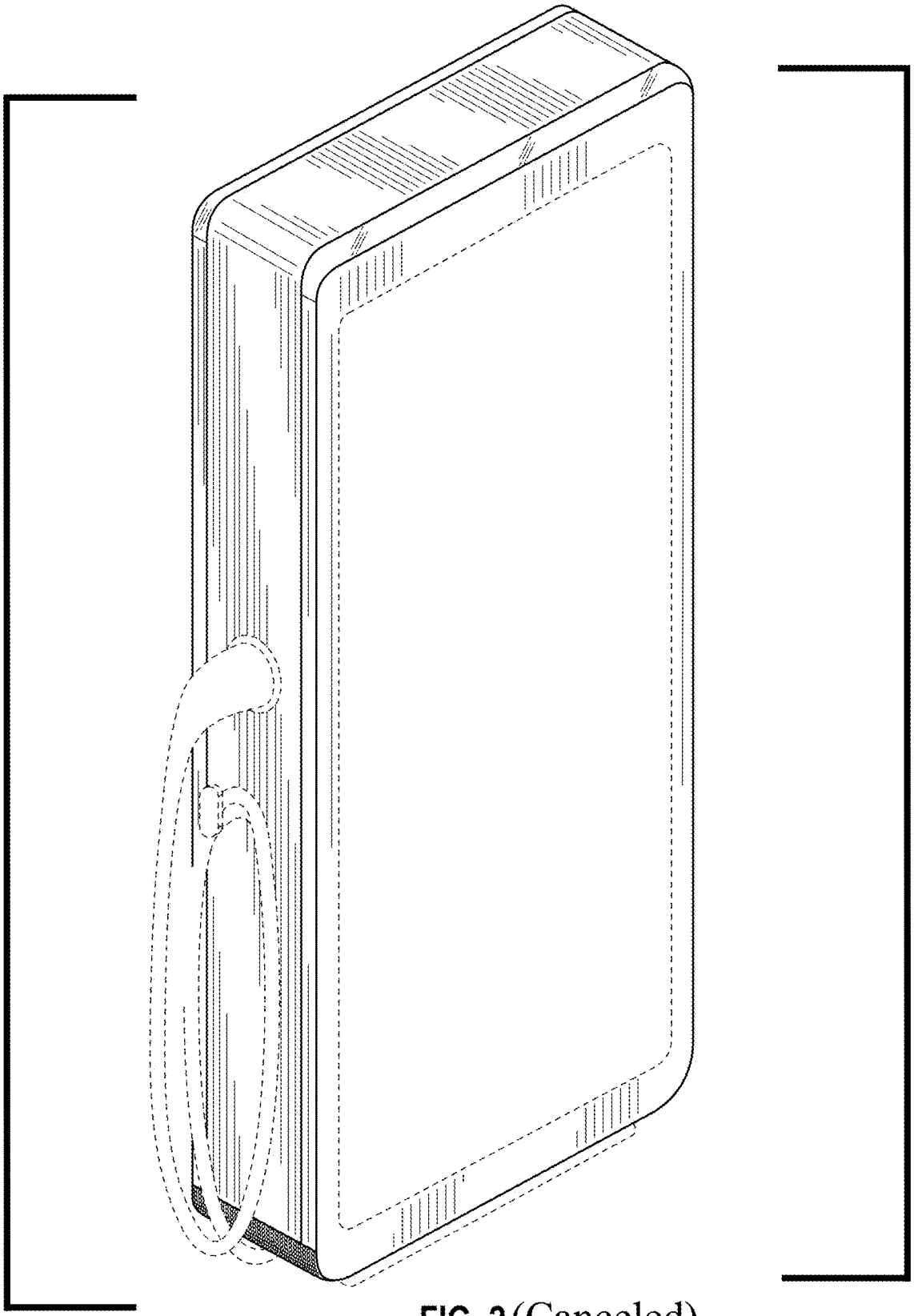
Figure 3:
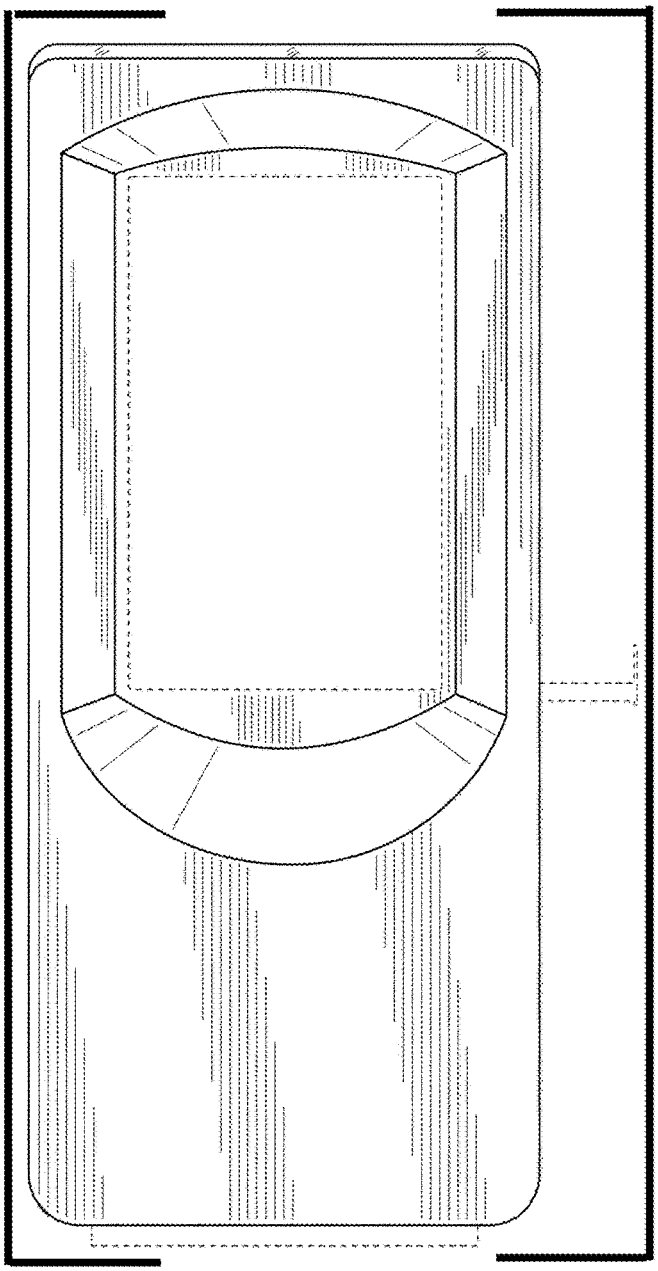
Figure 4:
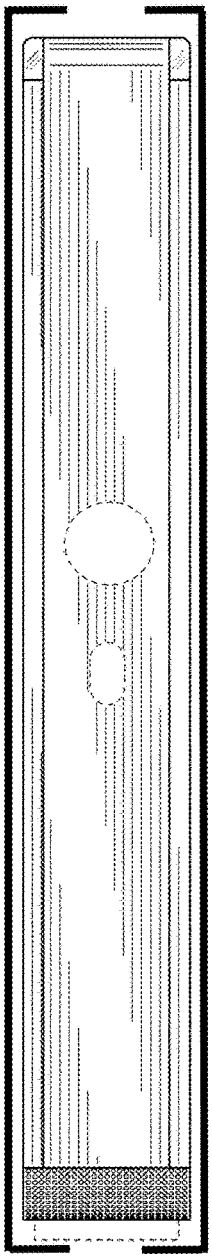
Figure 7:
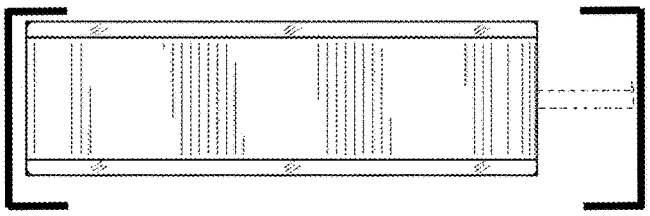
Figure 5:
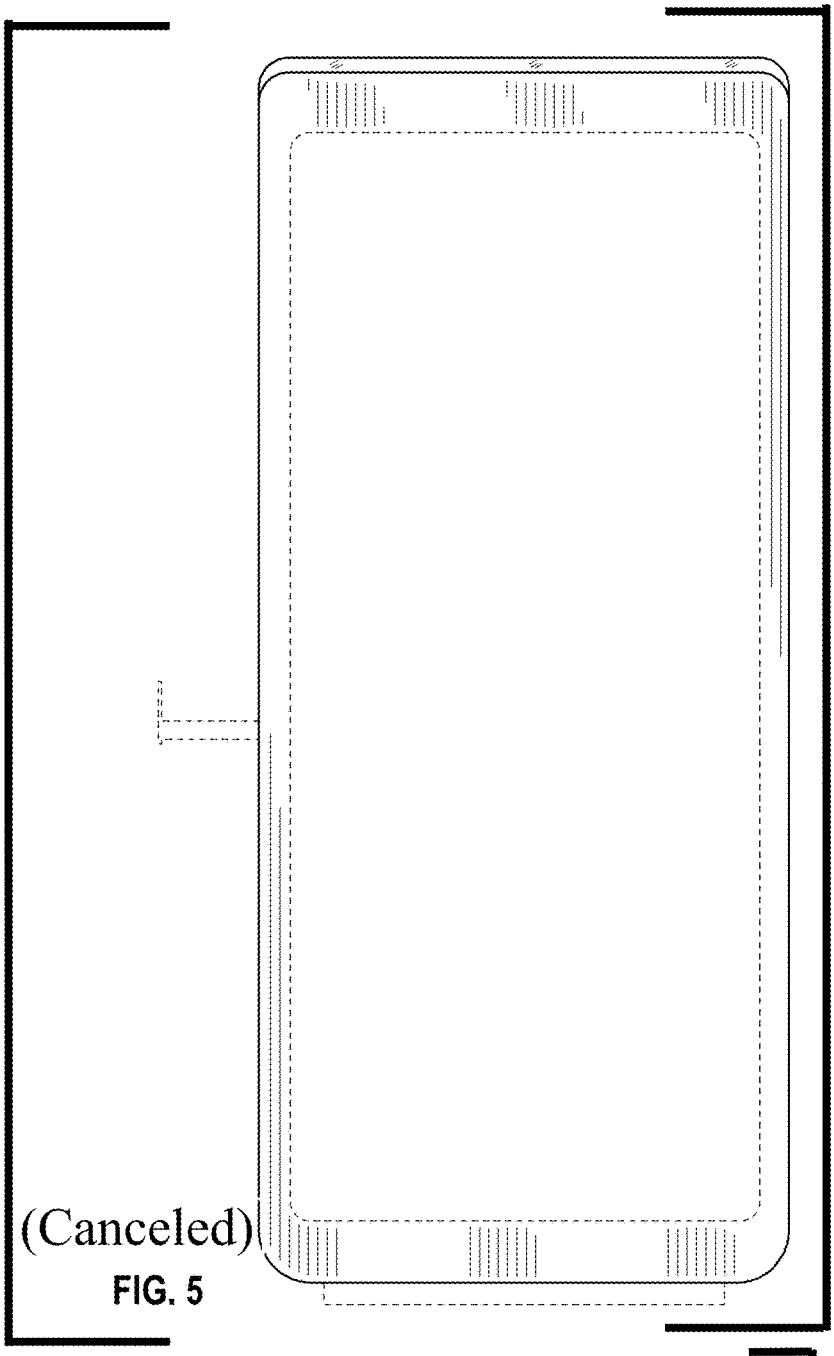
Figure 6:
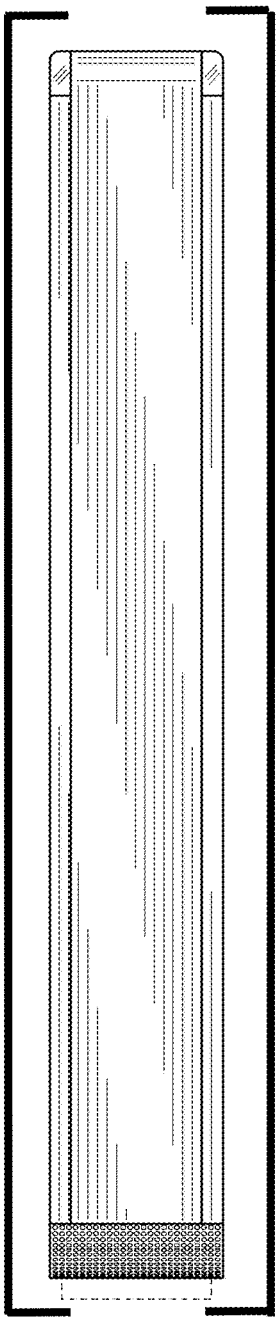
Figure 8:
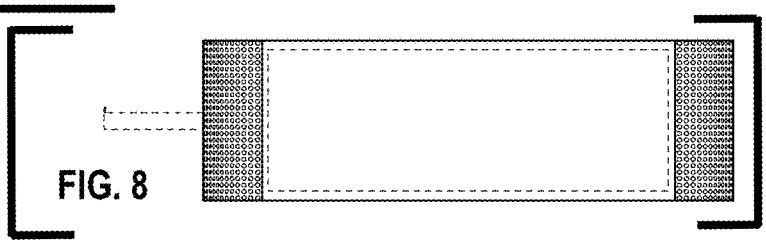

Matter enclosed in heavy brackets [ ] appears in the original patent but forms no part of this reissue; matter printed in italics indicates the additions made by reissue.

FIG. 1 (Canceled)

FIG. 2 (Canceled)

(Canceled)

(Canceled)

(Canceled)

(Canceled)

(Canceled)

(Canceled)

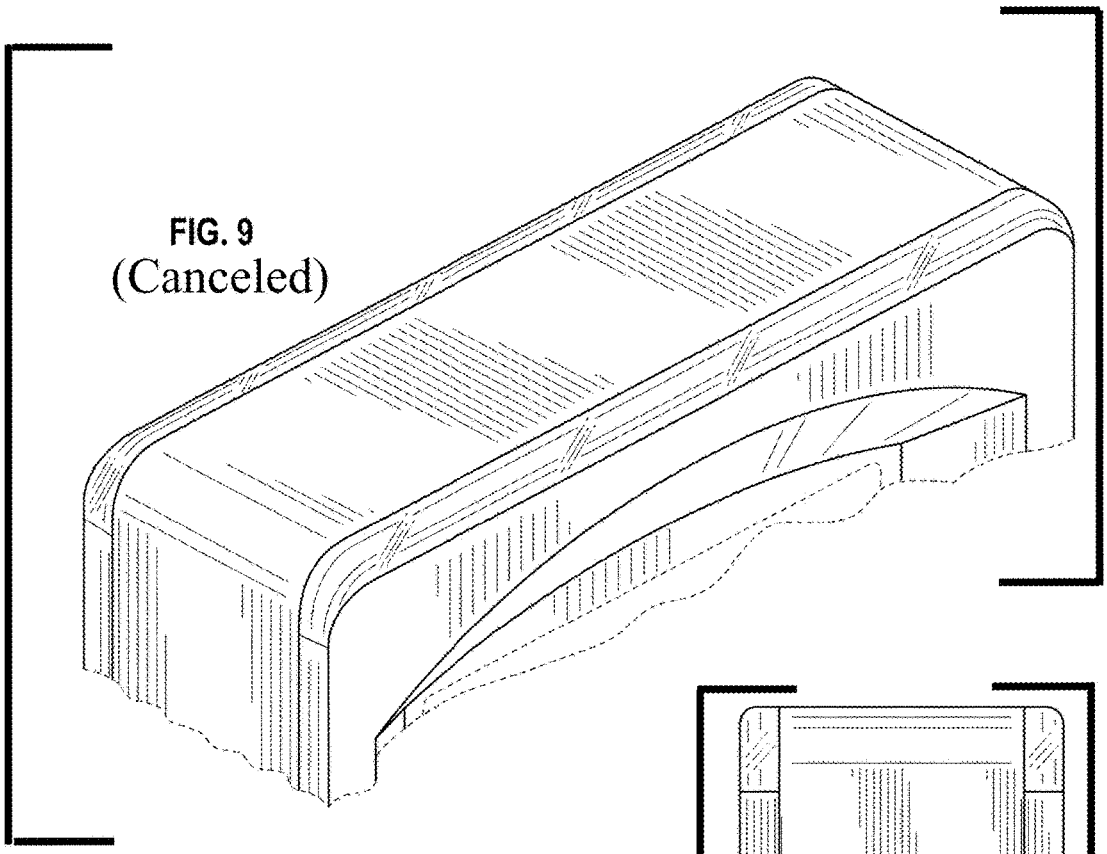
FIG. 9
(Canceled)
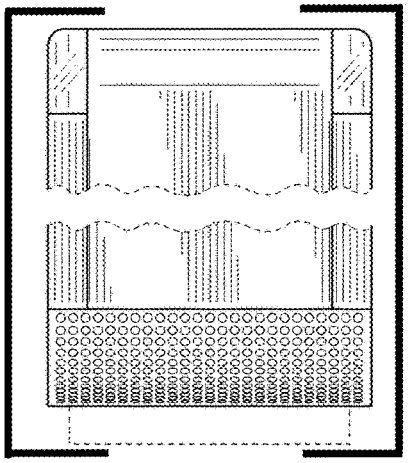
FIG. 10
(Canceled)
(Canceled)
FIG. 11
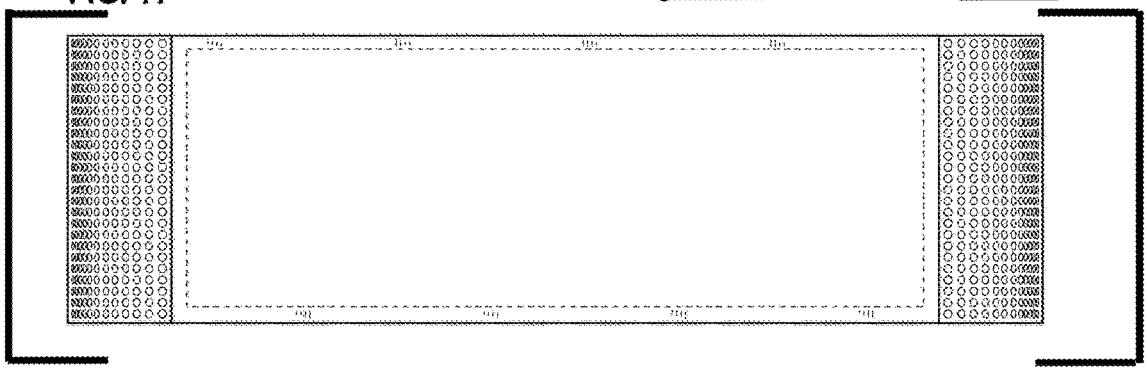

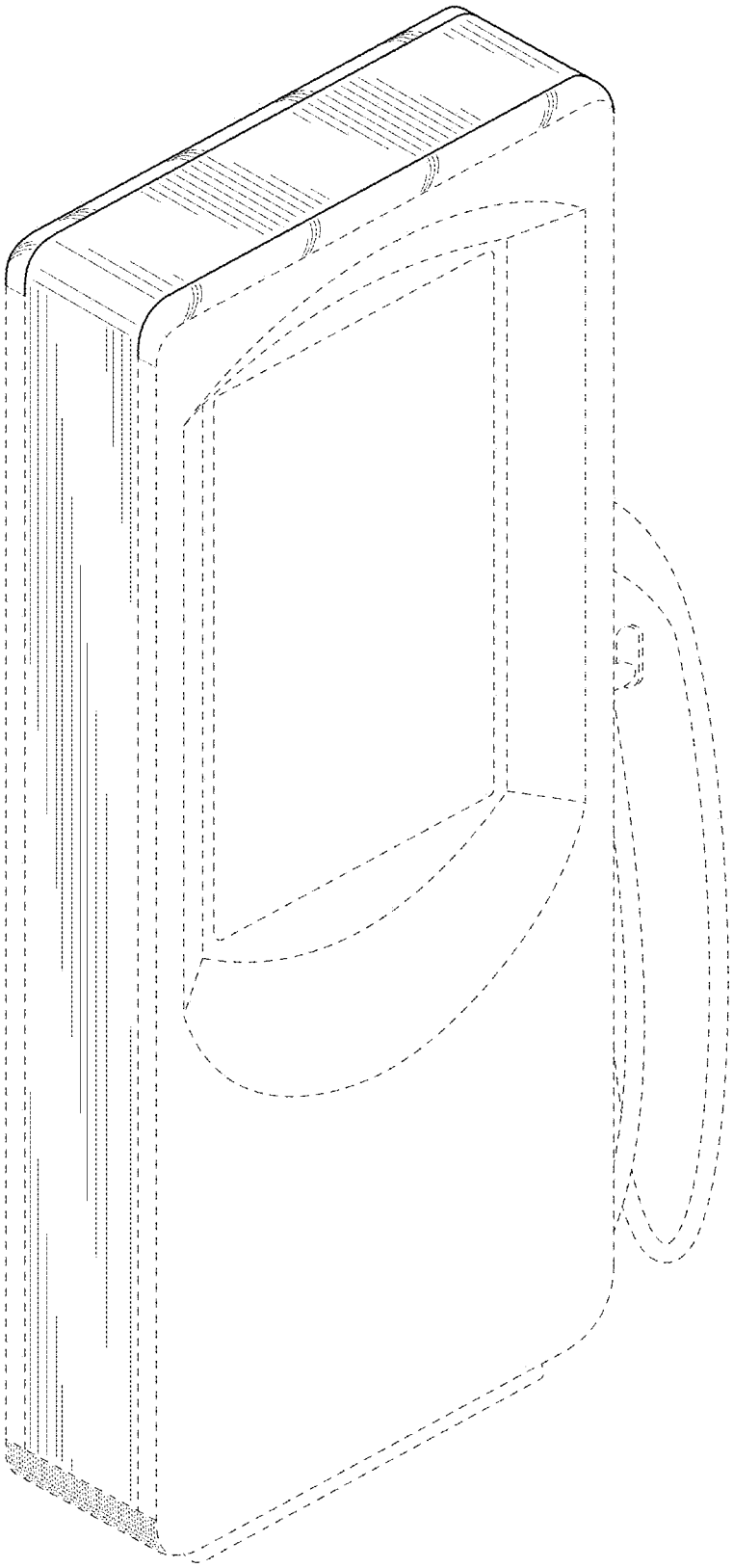
FIG. 12 (NEW)

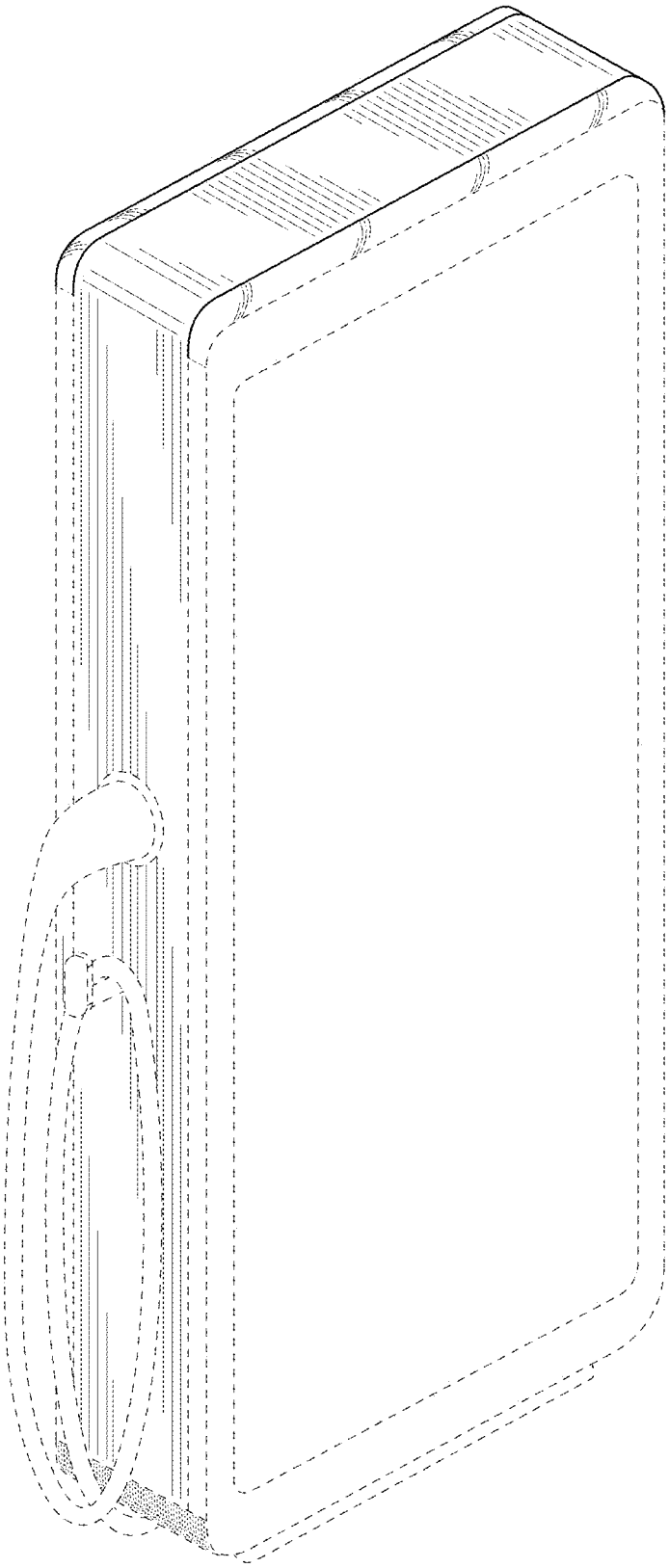
FIG. 13 (NEW)

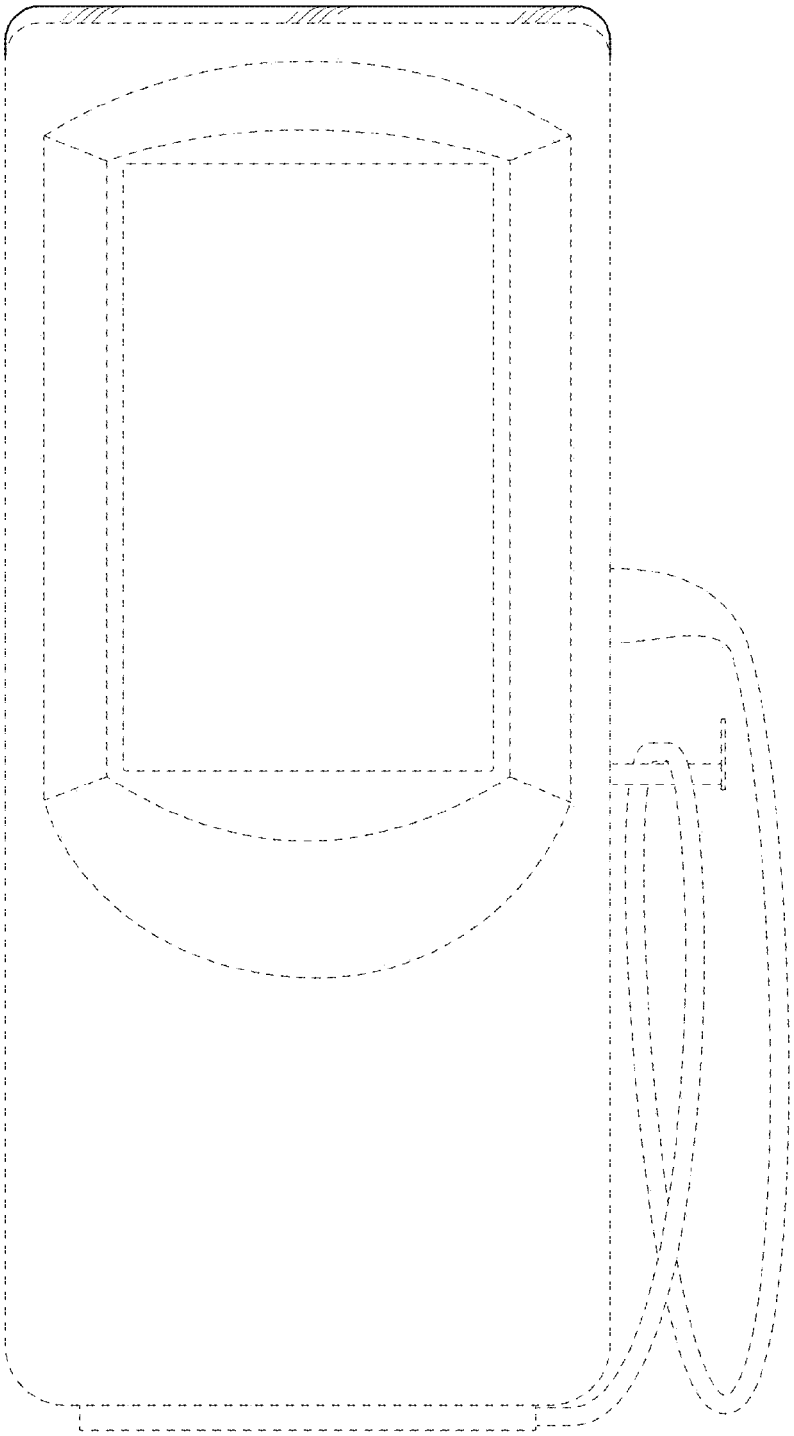
FIG. 14 (NEW)
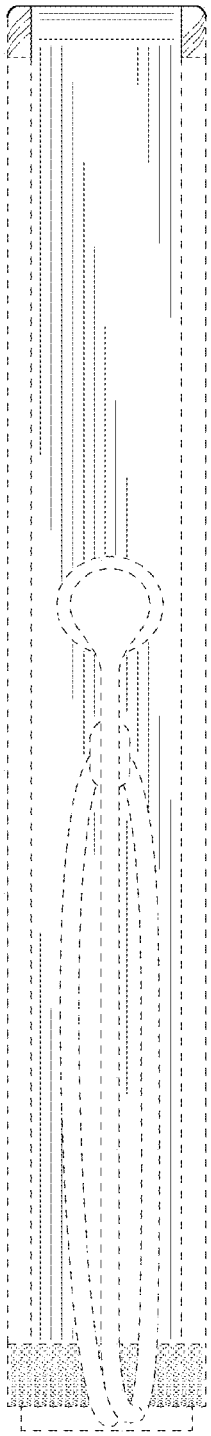
FIG. 15 (NEW)
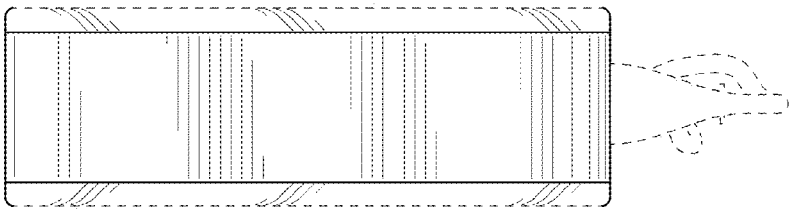
FIG. 18 (NEW)

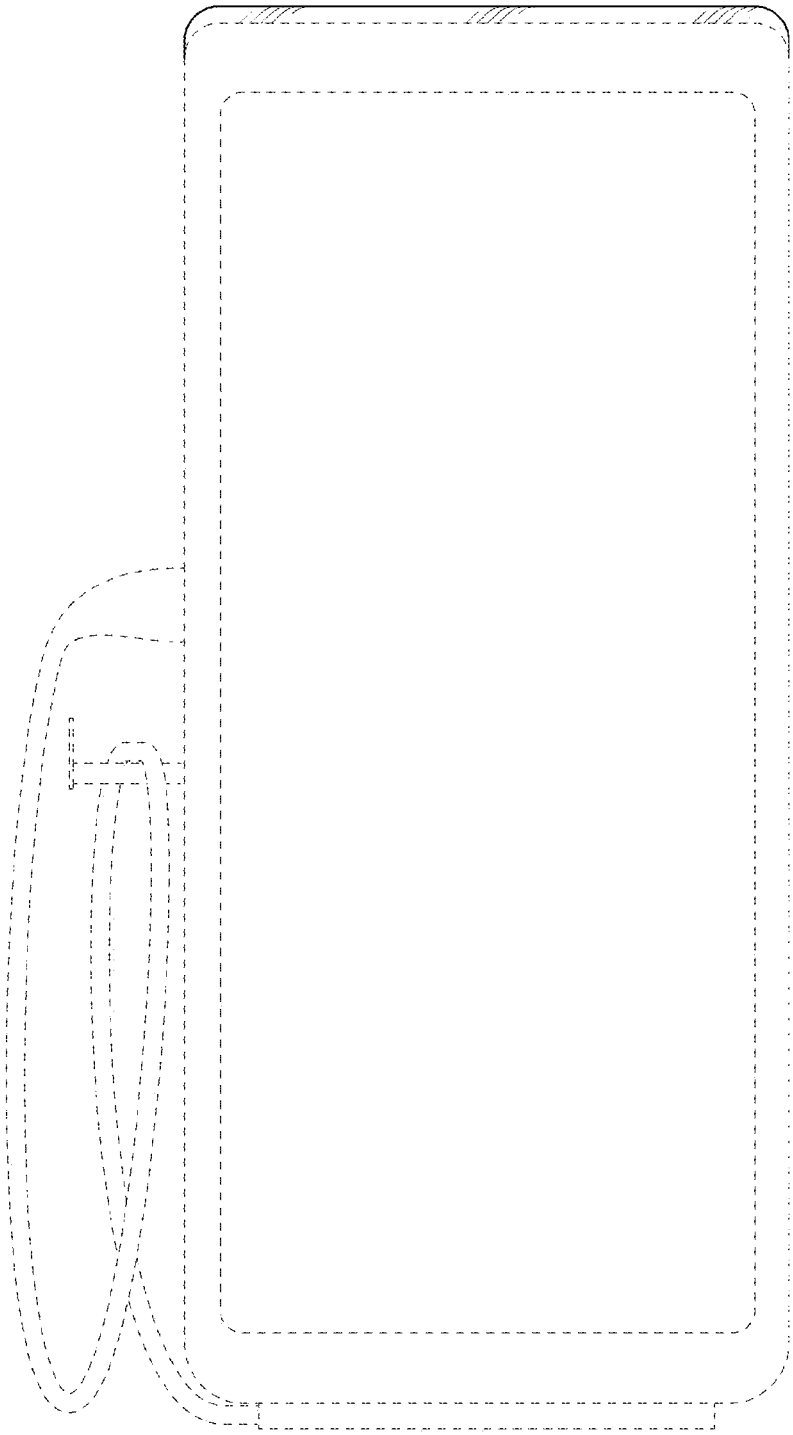
FIG. 16 (NEW)
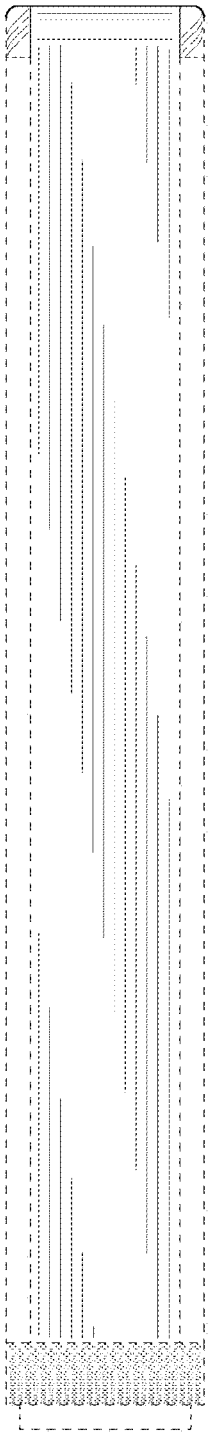
FIG. 17 (NEW)
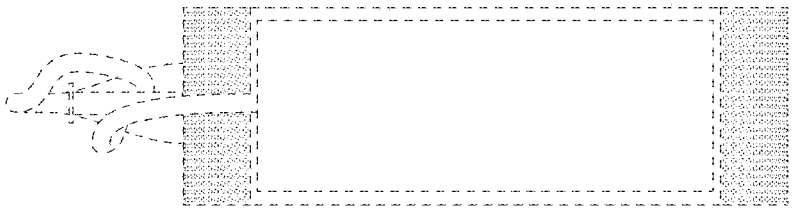
FIG. 19 (NEW)

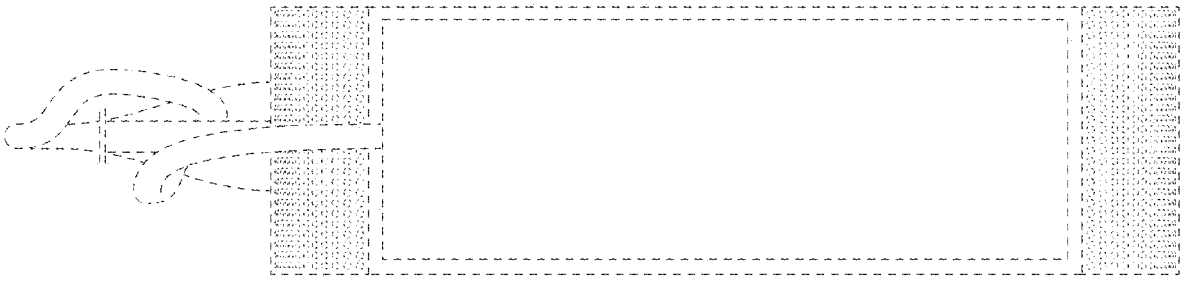

FIG. 20 (NEW)
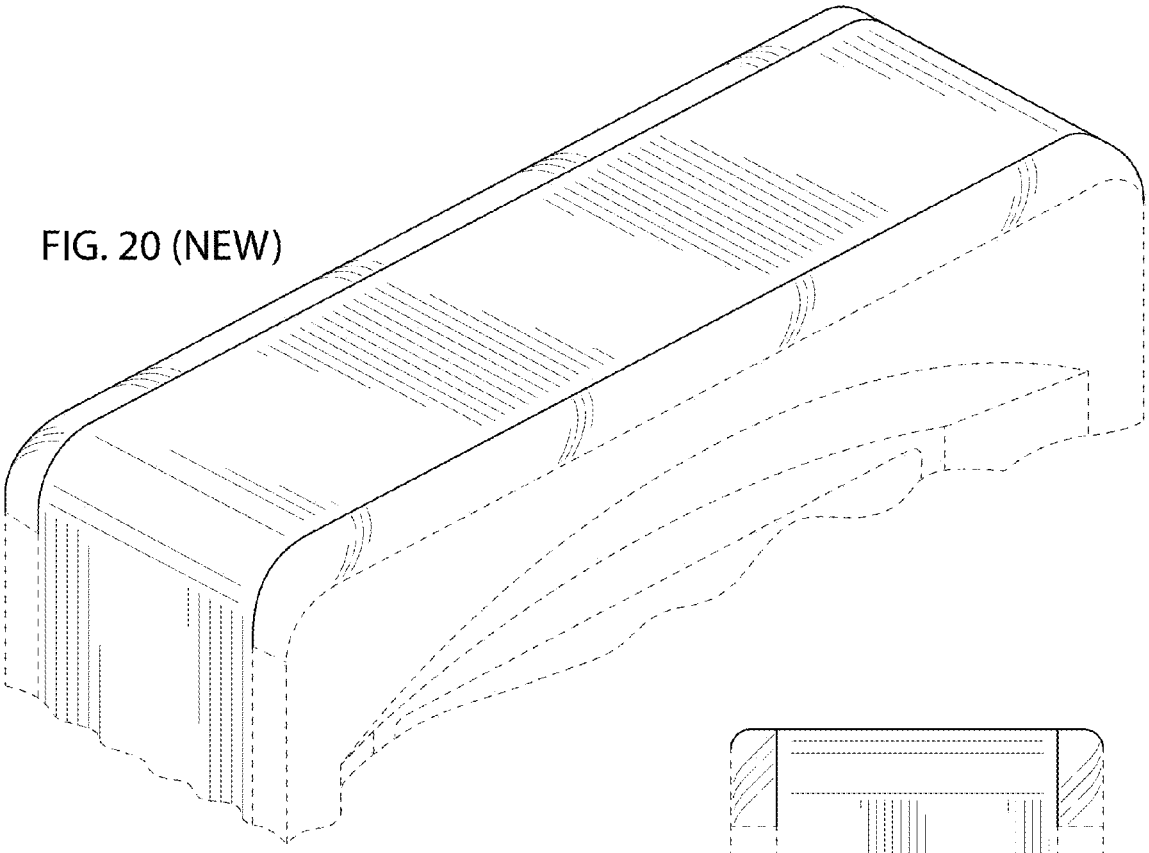
FIG. 21 (NEW)
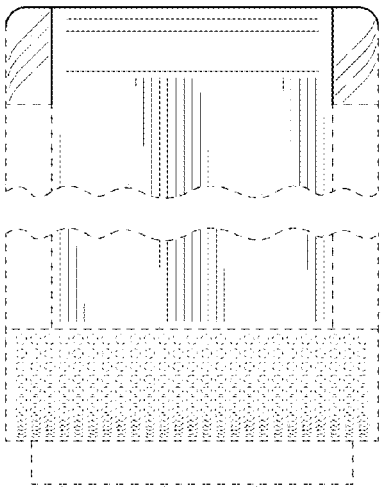
FIG. 22 (NEW)